United States Patent
Talmi

(10) Patent No.: US 11,715,005 B2
(45) Date of Patent: Aug. 1, 2023

(54) VERIFICATION AND IDENTIFICATION OF A NEURAL NETWORK

(71) Applicant: CARIAD SE, Tallinn (EE)

(72) Inventor: Kay Talmi, Berlin (DE)

(73) Assignee: CARIAD SE, Tallinn (EE)

(*) Notice: Subject to any disclaimer, the term of this patent is extended or adjusted under 35 U.S.C. 154(b) by 653 days.

(21) Appl. No.: 16/712,942

(22) Filed: Dec. 12, 2019

(65) Prior Publication Data

US 2020/0193295 A1 Jun. 18, 2020

(30) Foreign Application Priority Data

Dec. 13, 2018 (DE) ...................... 10 2018 221 703.3

(51) Int. Cl.
G06F 21/51 (2013.01)
G06N 3/08 (2023.01)
(Continued)

(52) U.S. Cl.
CPC .............. G06N 3/08 (2013.01); G06F 21/51 (2013.01); G06N 3/04 (2013.01); H04L 9/3236 (2013.01); H04L 9/3239 (2013.01); H04L 63/12 (2013.01)

(58) Field of Classification Search
CPC .... G06F 21/51; G06F 21/565; G06F 21/6272; G06F 21/64; G06F 21/645; G06F 21/44;
(Continued)

(56) References Cited

U.S. PATENT DOCUMENTS

| | | | |
|---|---|---|---|
| 8,484,347 B1 | 7/2013 | Gostev et al. | |
| 2013/0080070 A1* | 3/2013 | Pai ......................... | G16C 20/70 702/19 |

(Continued)

FOREIGN PATENT DOCUMENTS

| | | | | |
|---|---|---|---|---|
| CN | 107545181 A | * | 1/2018 | |
| CN | 109698822 A | * | 4/2019 | ........... G06N 3/0454 |
| DE | 102016221700 A1 | | 5/2018 | |

OTHER PUBLICATIONS

He, Zecheng et al.; VerIDeep: Verifying Integrity of Deep Neural Networks through Sensitive-Sample Fingerprinting; obtained from < https://arxiv.org/abs/1808.03277>, retrieved on Jun. 17, 2022 (Year: 2018).*

(Continued)

*Primary Examiner* — Farid Homayounmehr
*Assistant Examiner* — Zhimei Zhu
(74) *Attorney, Agent, or Firm* — Schwegman Lundberg & Woessner, P.A.

(57) ABSTRACT

The application relates to a method for verifying characteristic features of a neural network, comprising obtaining the neural network as well as an identifier assigned to the neural network, determining the characteristic features of the neural network, calculating a first hash code using a predetermined hash function from the characteristic features of the neural network, obtaining a second hash code assigned to the identifier from a secure database, as well as verifying the neural network by comparing the first hash code to the second hash code. The application furthermore comprises a computer software product which can be downloaded to the internal memory of a digital computer and which comprises software code sections with which the steps according to the method described here are carried out when the software is executed on a computer.

20 Claims, 2 Drawing Sheets

300 ⟶

Figure 1:
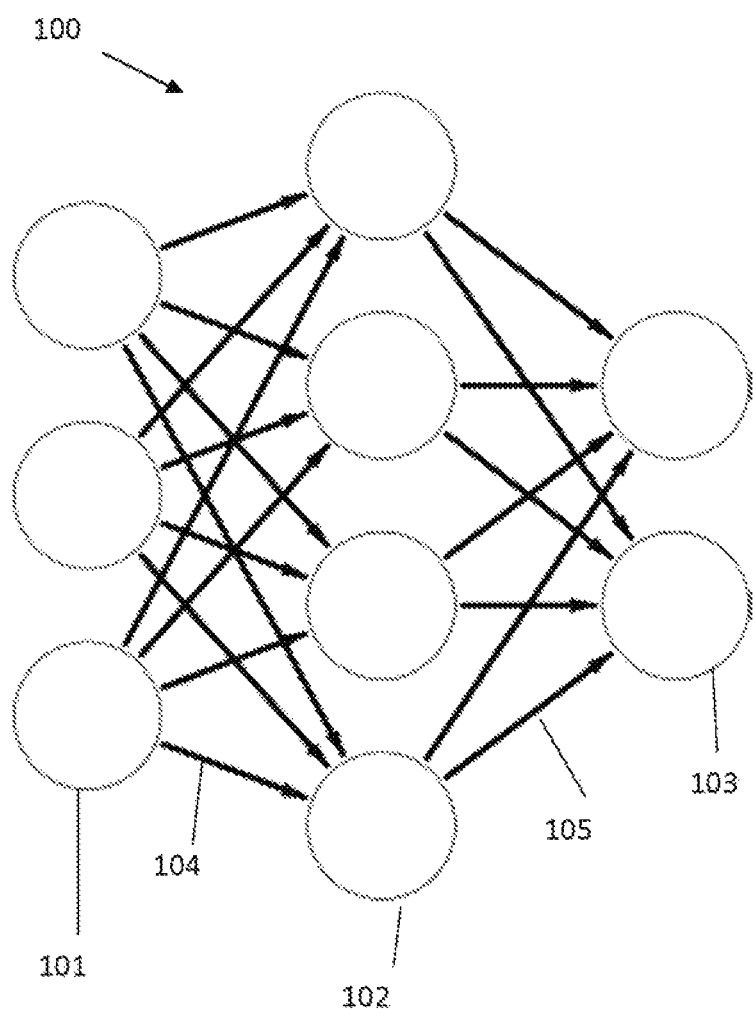

| | |
|---|---|
| Number of layers | 3 |
| Number of nodes | 9 |
| Sum of largest weights | 0.234 |
| Sum of smalles weights | 0.0123 |

(51) Int. Cl.
    *G06N 3/04*         (2023.01)
    *H04L 9/32*         (2006.01)
    *H04L 9/40*         (2022.01)

(58) Field of Classification Search
    CPC ....... G06F 21/45; G06F 21/50; H04L 63/123; H04L 63/12; H04L 9/3236; H04L 9/3239; H04L 9/0643
    See application file for complete search history.

(56) References Cited

U.S. PATENT DOCUMENTS

| | | | |
|---|---|---|---|
| 2016/0283920 A1 | 9/2016 | Fisher et al. | |
| 2018/0336463 A1* | 11/2018 | Bloom | G06N 3/0454 |
| 2019/0042937 A1* | 2/2019 | Sheller | G06N 3/08 |
| 2019/0265701 A1* | 8/2019 | Troia | G06F 21/00 |
| 2021/0067655 A1* | 3/2021 | Yoon | H04N 1/00244 |

OTHER PUBLICATIONS

"SHA-256 Algorithm Overview", by N-able, retrieved from <https://www.n-able.com/blog/sha-256-encryption#:~:text=SHA%2D256%20is%20a%20patented,as%20long%20as%20when%20unencrypted.>, obtained on Jun. 18, 2022 (Year: 2019).*

"German Application Serial No. 10 2018 221 703.3 Examination Report dated Nov. 15, 2019", (Nov. 15, 2019), 11 pgs.

* cited by examiner

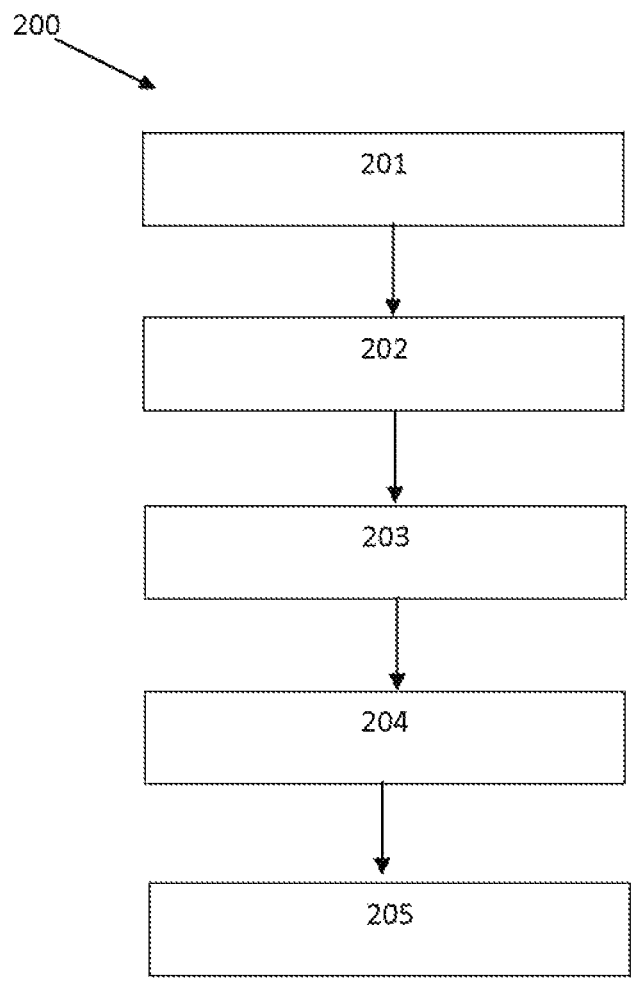

VERIFICATION AND IDENTIFICATION OF A NEURAL NETWORK

PRIORITY APPLICATIONS

This application claims the benefit of priority of German Application Serial No. 10 2018 221 703.3, filed Dec. 13, 2018, which is hereby incorporated by reference in its entirety.

The present application relates to a computer-implemented method executed by one or more computer processors for identifying, verifying, and/or determining the performance characteristics of a neural network.

Neural networks (NN), also known as artificial neural networks, are computer-implemented systems which exhibit a number of so-called layers and weights. The layers form the basic structure of the network and have "nodes", wherein the nodes of different layers can be linked and the communication between the nodes is regulated by the weights. The weights may be understood to be a kind of filter. The layers, nodes, and node links are also referred to as the neural network's "architecture".

When a neural network is trained, the weights are first initialized with the pre-set values and then refined in the training phase using training and test data (input data) in many iterations.

In training a neural network, often a back propagation algorithm is used, having the following phases. First, an input sample is set up and propagated forward throughout the network, i.e. values are successively calculated for the nodes of the various layers by means of a used function and the input values and weights for the respective nodes. The network output is then compared with a known, desired output value. The difference between the two values is then called the network error. The error is then propagated back to the input layer via the output layer. In the process, the weights of the connections are changed depending on their influence on the error. Repeatedly inputting the input values of the training dataset leads to an approximation of the desired output.

After the neural network has been trained, it is then used to calculate (predict) output values for previously unknown input values.

The performance characteristic of a neural network are its architecture (comprising, for example, the number of layers, the number of nodes in the various layers, links between the nodes, etc.) as well as the weights. The performance characteristics at the end of a training phase are of particular importance, when the neural network that has been trained and optimized by a user is made available to other users.

In using neural networks, it is desirable for the user to be able to ascertain and verify the origin and performance characteristics of a neural network. It is particularly desirable for a user to be able to easily recognize when a neural network has been modified by another user and thus potentially no longer corresponds to the manufacturer's specifications.

A method by which a neural network can be verified using a predefined "watchdog-dataset" is known from WO 2016/043734 A1.

Furthermore, a method for training a neural network in which the weights may be stored in encoded form in order to prevent unauthorized access to the neural network is known from US 2016/0283842 A1.

However, there continues to be a demand for a simple, inexpensive method for securing and verifying neural networks in order to prevent or at least detect unauthorized access and/or modifications.

The object is solved by the features in the independent claims of the present patent application. Further advantageous exemplary embodiments are defined by the dependent claims.

The method as described includes the following steps, which are all executed automatically by one or more computer processors:

obtaining the neural network as well as an identifier assigned to the neural network, determining the characteristic features of the neural network, calculating a first hash code using a predetermined hash function from the characteristic features of the neural network, obtaining a second hash code assigned to the identifier from a secure database, and verifying the neural network by comparing the first hash code to the second hash code.

A hash code, also known as a hash value, is thus calculated for a neural network and stored in a central location, for example a central, secure database, together with an identifier of the associated neural network.

If a copy of the neural network is to be used, the hash code of the copy of the neural network may be calculated by the processor and compared to the associated original neural network's hash code stored in the central location. If the two hash codes match, it may be assumed that the copy of the neural network has the same characteristics as the original neural network and has not been manipulated.

Hash functions may be used to secure data integrity. This involves mapping a dataset's characteristic values (or, where applicable, the entire dataset) to a smaller numeric value by means of a function (hash function). A first such hash code is calculated after creating the dataset and then stored in a secure location.

If a user later wishes to use the dataset, the user may also calculate the hash code of the obtained dataset using a computer processor and then compare it to the value for this dataset stored in the secure location. If the two values match, it may be assumed that the dataset used by the user corresponds to the original dataset. If the two hash codes do not match, the conclusion is that the dataset has been manipulated. The user can thus recognize manipulation and, accordingly, not use the dataset.

When using hash codes, it should be borne in mind that these are generally not injective, that is to say that the same hash code is assigned to several different datasets. However, the likelihood of this occurring randomly is low.

A subgroup of hash functions are cryptographic hash functions, which have special security characteristics. In particular, cryptographic hash functions are collision resistant, making it practically impossible to find, for a given input value, a second input value, with both input values mapping to the same hash code. Even in cryptographic functions, collisions are in principle possible, but knowingly and deliberately generating colliding input values is only possible at great computational cost and is therefore virtually excluded. In the described method, a collision resistant hash function is preferably used.

The neural network may preferably be obtained by downloading it from the Internet, from an Internet-based distribution platform, such as an app store, or as an attachment to an email, and then be stored in the memory assigned to the respective processor. Other means of digital transfer into the memory of a processor, for example using physical storage media (CDs, USB flash drives, memory cards, etc.) are also possible.

Furthermore, the database may preferably be located on a secure central server or in a cloud. The database may furthermore be registered using a "distributed ledger", for example a blockchain algorithm.

Preferably, the user may display, on a computer display, the characteristic information about the neural network which is also stored or mapped in the hash code by the computer processor. The neural network is thus no longer a black box, instead the characteristic information is placed at the disposal of the user in a transparent manner. The user may thus comprehend how the neural network was trained and the architecture and weights it presents. This allows neural networks, which are used in many software products such as driver assistance systems for autonomous driving, to be understood and verified.

Characteristic data on the neural network used during creation of the hash code may preferably also contain information about the provider, creator, or developer of the neural network. The hash code therefore changes as soon as the registered provider is modified. This allows prevention of someone selling another provider's neural network as their own product.

It is furthermore possible for the method to include the following steps before obtaining the neural network and the assigned identifier from the database, these steps being executed by one or more computer processors:
  uploading a trained neural network to a platform assigned to the secure database,
  assigning an identifier to the trained neural network,
  determining the characteristic features of the trained neural network,
  calculating a hash code using the predefined hash function from the characteristic features of the neural network, and
  storing the calculated hash code of the trained neural network together with the identifier of the trained neural network in the secure database;
  wherein the characteristic information of the neural network which is stored or mapped in the hash code is displayed during a download of the neural network from the database or the platform.

It is thus possible for a provider to upload, for identification and verification purposes, a neural network trained by the provider to the respective platform assigned to the database. The values required for a subsequent verification, i.e. the characteristic features and the hash code calculated therefrom, are then calculated on the platform or directly in the secure database. A subsequent verification is thus possible, even if the neural network is later distributed by another Internet-based provider. The identification allows the downloaded neural network to be compared with the information stored in the secure database.

The method described may also be implemented as a computer program product. Herein, the compute program product is provided to be downloaded to the internal memory of a digital computer, and comprises software code sections with which the steps according to the method described here are carried out when the software is executed on a computer. Verification of a downloaded neural network may thus be effectuated automatically or semi-automatically with a few user keystrokes.

Below, the invention is described using the figures. These show:
  FIG. 1 a schematic diagram of a neural network,
  FIG. 2 a flow diagram of the method according to the invention, and
  FIG. 3 an exemplary table with values which can be used in calculating the hash code.

FIG. 1 shows a neural network 100, comprising an input layer 101, an output layer 103, and a layer 102 hidden therebetween. There are unidirectional links 104 between the nodes of the input layer 101 and the nodes of the hidden layer 102, and there are also unidirectional links 105 between the nodes of the hidden layer 102 and the nodes of the output layer 103. Alternatively, the neural network may also comprise several hidden layers and more or fewer nodes per layer.

Alternatively, the neural network may further also be a recurrent neural network, i.e. a network characterized by additional links between nodes of a layer and nodes of the same or a preceding layer.

Each of the links 104, 105 may be associated with a weight, wherein the respective weight influences the amount of influence the respective starting node of the unidirectional link has on the value of the assigned end node that is to be calculated. Additionally, an activation function which specifies how the node value is calculated from the weighted values of the respective input node is assigned to each node of the hidden layer 102 and each node of the output layer 103 respectively.

The neural network is initialized by a processor using predefined values. These values may contain information on the architecture (number of layer, number of nodes per layer, links between the nodes) as well as information on the activation functions used and on the initial weights.

The neural network is then "trained" by the processor using a training dataset, i.e. the weights are optimized using the training data such that (in supervised learning) the input values are mapped as precisely as possible to the output values predetermined in the training dataset, or such that (in unsupervised learning) input data patterns may be recognized especially well. In so doing, the usual machine learning procedures such as cross-validation may be used for optimization with respect to specified error metrics.

Training neural networks may preferably be effectuated by the processor, using the back propagation algorithm described in the introduction and a large number of iterations of the training data.

The trained neural network can then be used to predict or calculate output values for new, previously unknown input values.

According to method described here, when training of the neural network is complete, the neural network's creator or provider uses a predefined hash function to calculate a hash code for characteristic values of the trained neural network. These characteristic values comprise the neural network's architecture, the weights used, and an identifier of the neural network's provider. Furthermore, details on the training method and/or training dataset used may optionally be used in calculating the hash codes; the network's metadata may, for instance, include an Internet address where the data used can be found.

The data used in calculating the hash codes may each be gathered from the neural network.

For example, the hash value could be calculated by the processor based on the following data: number of layers, number of nodes per layer, total number of nodes, total number of weights, etc. Alternatively, some of the various values may also be concatenated such that a hash value, preferably being an integer, is created. Further details on calculating the hash value are disclosed below with respect to FIG. 3.

The calculated hash code is then stored in a secure database along with an identifier of the neural network, wherein this secure database is, for example, a part of a blockchain network.

Calculation of the hash code may alternatively take place directly in the database after storing the neural network, as an additional database service.

FIG. 2 shows the verification 200 of the neural network by a user. The verification procedure comprises the following steps:

A prerequisite for the procedure described here is that creator has stored the trained neural network along with the hash code in the secure database. The database assigns an identifier to the neural network. All steps described below are executed by one or more computer processors.

Step 201: obtaining the neural network as well as an identifier assigned to the neural network, wherein the neural network is downloaded from the Internet by the user, for example from a website or from an Internet-based distribution platform, such as an app store, or is digitally transferred to the user in another manner, for example via email or a digital storage medium. The identifier assigned to the network may for example comprise an Internet address where the neural network is made available by the user, or the identifier may be an identifier assigned by a blockchain network or another external provider.

Step 202: determining the characteristic features of the neural network. The user may then extract the characteristic features such as weights and structural features (the network's architecture) as well as manufacturer's specifications from the neural network. These are data which may be gathered directly from the neural network, which are, for example, output when the neural network is executed using certain pre-defined parameters. An additional key is usually not required for extracting these data, however a key may be used in order to increase security.

Step 203: calculating a first hash code using a predetermined hash function from the characteristic features of the neural network. Using a predefined hash function, the user may then calculate a hash code for the extracted characteristic features of the neural network. In so doing, a collision resistant hash function is preferably used, making it practically impossible to find a second input value for a given input value resulting in the same hash code as a pre-defined input value.

Step 204: obtaining a second hash code assigned to the identifier from a secure database. The user then downloads the hash code assigned to the identifier of the neural network from the secure database. The secure database is secured, for instance by use of a blockchain algorithm or another suitable security procedure, such that an authenticity of the values stored in this database may be assumed.

Step 205: verifying the neural network by comparing the first hash code to the second hash code. The hash code calculated for the present neural network by the user is then compared with the hash code obtained from the secure database. If the two hash codes match, it may be assumed, due to the hash function's collision resistance and the security of the secure database, that the present neural network matches the neural network provided by the user and that the neural network has not been manipulated or hacked.

If, however, the two hash codes do not match, there has been an unauthorized modification of the neural network, and in this case the neural network is no longer used by the user. The user may also report to the provider that the neural network has been manipulated.

FIG. 3 shows a table 300 indicating various numerical values which may be considered for calculating the hash codes. Information on the architecture of the neural network (number of layers, total number of nodes, number of nodes in the individual layers, structure of the graph, etc.) may thus be considered. Furthermore, the weights are taken into consideration. As the weights are generally real numbers between 0 and 1 and are usually normalized, the weights may either be rounded or (partially) added up. For example, the largest or smallest weight per layer may be added up, or each first two decimal places are considered, etc. Moreover, information on the provider, for example in the form of a registration number, may be used. The various numerical values may then be combined by the hash function, for instance using a weighted sum and/or by concatenating the individual values. It is also possible to preprocess the "raw data", for example by discretization, summation, and/or concatenation, and then use a known hash function to transfer the resulting number into a hash code. Known cryptographic hash functions are, for example, the Merkle-Damgård construction, SHA, Whirlpool, or other hash functions, as described, for example, under "https://en.wikipedia.org/wiki/Cryptographic_hash_function".

Alternatively, a non-numerical value such as a character string may also be used as a hash code.

The described method may be implemented as a computer software product, the computer software product being downloadable to the internal memory of a digital computer and comprising software code sections with which the steps according to the method described here are carried out when the software is executed on a computer. Automatically or semi-automatically verifying the downloaded neural network is thus possible.

When the characteristic values used in creating the hash code include details on the provider, the described method allows unauthorized use and unauthorized sale of the neural network to be detected and, if necessary, prevented.

The invention claimed is:

1. A method for verifying characteristic features of a trained neural network, the method comprising:
   obtaining the trained neural network as well as an identifier assigned to the trained neural network;
   determining one or more characteristic features of the trained neural network;
   calculating a first hash code using a predetermined hash function from the one or more characteristic features of the trained neural network;
   obtaining a second hash code assigned to the identifier from a secure database; and
   verifying or rejecting the trained neural network by comparing the first hash code to the second hash code, wherein the one or more characteristic features of the trained neural network comprise one or more details on a training method used for training the trained neural network.

2. The method according to claim 1, wherein the trained neural network is obtained by downloading from the Internet, from an Internet-based distribution platform, or as an attachment to an email.

3. The method according to claim 1, wherein the secure database is part of a blockchain network.

4. The method according to claim 1, wherein the one or more characteristic features of the trained neural network further include:
   an architecture and a weight of the trained neural network.

5. The method according to claim 4, wherein the one or more characteristic features further include:
an identifier of a provider of the trained neural network.

6. The method according to claim 1, wherein the predetermined hash function includes a collision resistant hash function.

7. The method according to claim 1, wherein the method, before obtaining the trained neural network and the assigned identifier from the secure database, further includes:
uploading the trained neural network to a platform assigned to the secure database;
assigning the identifier to the trained neural network;
determining the one or more characteristic features of the trained neural network;
calculating the second hash code using the predetermined hash function from the one or more characteristic features of the trained neural network; and
storing the calculated second hash code of the trained neural network together with the identifier of the trained neural network in the secure database;
wherein the one or more characteristic features of the trained neural network which are stored or mapped in the calculated second hash code are displayed during a download of the trained neural network from the secure database or the platform.

8. A non-transitory computer-readable medium that, when executed by a processor of a computer, cause the processor to execute operations for verifying characteristic features of a trained neural network, the operations comprising:
obtaining the trained neural network;
obtaining an identifier assigned to the trained neural network;
determining one or more characteristic features of the trained neural network;
calculating a first hash code using a predetermined hash function from the one or more characteristic features;
obtaining a second hash code assigned to the identifier from a secure database; and
verifying or rejecting the trained neural network by comparing the first hash code to the second hash code, wherein the one or more characteristic features of the trained neural network include one or more details on a training method used for training the trained neural network.

9. The non-transitory computer-readable medium of claim 8, wherein the secure database is part of a blockchain network.

10. The non-transitory computer-readable medium of claim 8, wherein the one or more characteristic features further include at least one of an architecture of the trained neural network, a provider of the trained neural network, or a weight of the trained neural network.

11. The non-transitory computer-readable medium of claim 8, wherein the predetermined hash function includes a collision resistant hash function.

12. The non-transitory computer-readable medium of claim 8, wherein the trained neural network is obtained by downloading the trained neural network from an internet connected source, from an internet-based distribution platform, or as an attachment to an email.

13. The non-transitory computer-readable medium of claim 8, the operations further comprising:
uploading the trained neural network to a platform assigned to the secure database;
assigning the identifier to the trained neural network;
determining the one or more characteristic features of the trained neural network;
calculating the second hash code using the predetermined hash function from the one or more characteristic features of the trained neural network; and
storing the calculated second hash code together with the identifier of the trained neural network in the secure database.

14. The non-transitory computer-readable medium of claim 13, wherein the one or more characteristic features of the trained neural network are stored or mapped in the calculated second hash code and displayed during a download of the trained neural network from the secure database or the platform.

15. A method for verifying characteristic features of a neural network, the method comprising:
uploading a trained neural network to a platform assigned to a secure database;
assigning an identifier to the trained neural network;
determining one or more characteristic features of the trained neural network;
calculating a second hash code using a predetermined hash function from the one or more characteristic features of the trained neural network;
storing the calculated second hash code together with the identifier of the trained neural network in a secure database;
obtaining the trained neural network;
obtaining the identifier assigned to the trained neural network;
calculating a first hash code using the predetermined hash function from the one or more characteristic features of the obtained trained neural network; and
verifying or rejecting the trained neural network by comparing the calculated first hash code to the second hash code, when the one or more characteristic features of the trained neural network include one or more details on a training method used for training the trained neural network.

16. The method of claim 15, wherein the trained neural network is obtained by downloading from at least one of an internet website, an internet-based distribution platform, or an email attachment.

17. The method of claim 15, wherein the secure database is part of a blockchain network.

18. The method of claim 15, wherein the one or more characteristic features further include an architecture of the trained neural network.

19. The method of claim 15, therein the one or more characteristic features further include a weight of the trained neural network.

20. The method of claim 15, wherein the predetermined hash function includes a collision resistant hash function.

* * * * *